July 25, 1967            E. D. SMITH            3,332,098

AUTOMATIC CAR WASHING APPARATUS

Filed April 12, 1965            6 Sheets-Sheet 1

*INVENTOR.*
EARL DALLAS SMITH

BY *Lockwood, Woodard, Smith & Weikart*
*Attorneys*

July 25, 1967

E. D. SMITH 3,332,098

AUTOMATIC CAR WASHING APPARATUS

Filed April 12, 1965

INVENTOR.
EARL DALLAS SMITH
BY Lockwood, Woodard, Smith & Weikart
Attorneys

July 25, 1967  E. D. SMITH  3,332,098
AUTOMATIC CAR WASHING APPARATUS
Filed April 12, 1965  6 Sheets-Sheet 3

INVENTOR.
EARL DALLAS SMITH

BY *Lockwood, Woodard, Smith & Weikart*
Attorneys

July 25, 1967  E. D. SMITH  3,332,098
AUTOMATIC CAR WASHING APPARATUS
Filed April 12, 1965  6 Sheets-Sheet 4

INVENTOR.
EARL DALLAS SMITH

BY *Lockwood, Woodard, Smith & Weikart*
Attorneys

July 25, 1967          E. D. SMITH          3,332,098

AUTOMATIC CAR WASHING APPARATUS

Filed April 12, 1965          6 Sheets-Sheet 5

Fig. 16A.

INVENTOR.
EARL DALLAS SMITH

Attorneys

July 25, 1967  E. D. SMITH  3,332,098

AUTOMATIC CAR WASHING APPARATUS

Filed April 12, 1965  6 Sheets-Sheet 6

INVENTOR.
EARL DALLAS SMITH

BY *Lockwood, Woodard, Smith & Weikart*
Attorneys

United States Patent Office 3,332,098
Patented July 25, 1967

3,332,098
AUTOMATIC CAR WASHING APPARATUS
Earl Dallas Smith, Scottsdale, Ariz., assignor to Southern Pacific Land Company, a corporation of California
Filed Apr. 12, 1965, Ser. No. 447,150
10 Claims. (Cl. 15—21)

This invention relates generally to equipment for washing vehicles and more particularly to an apparatus for washing automobiles and which is completely self-contained, not requiring installation in a building and not requiring special apparatus or installations at the site where the apparatus is to be located.

Car washing establishments are well known and typically incorporate a variety of equipment in buildings constructed by conventional methods. At the site where the car washing establishment is to be provided, various elaborate preparations are frequently required including the provision of pits or wells in the ground for some of the equipment, trenches, plumbing and heating connections, electrical conduit, and sewer connections. The result is that such establishments are permanent in nature and require substantial investments not only in site preparation, but also in building and equipment.

It is therefore an object of the present invention to provide an automatic car washing apparatus well adapted to installation at existing sites without modification of the site and without modification of the apparatus.

A further object is to provide such apparatus which can be installed and placed in operation at minimal expense.

A further object is to provide apparatus of comparatively simple and reliable construction but which is nevertheless completely automatic.

Described briefly, a typical embodiment of the present invention incorporates a plurality of prefabricated cubicles which can readily be shipped to the site where the car wash establishment is to be located, and quickly and easily assembled at the site. When assembled, the cubicles themselves and the roofing spanning the space between two rows of the cubicles form a building. The building thus provided is a self-contained unit including electrical service and controls, air compressor, lighting, and water distribution system. It requires only connections to some water supply source, three phase electrical energy source, and a sewer connection.

A conveyor is employed in the building for moving a car through the building for washing, rinsing, and drying. Electric motor driven cleaning brushes are mounted in various locations in the building and function in a predetermined sequence to wash the entire car except for the underside thereof. The brushes are constructed, arranged, and mounted so as to avoid damage to any portion of the vehicle, including radio antennas.

The full nature of the invention will be understood from the accompanying drawings and the following description and claims.

*General building and equipment arrangement*

Figure 1:
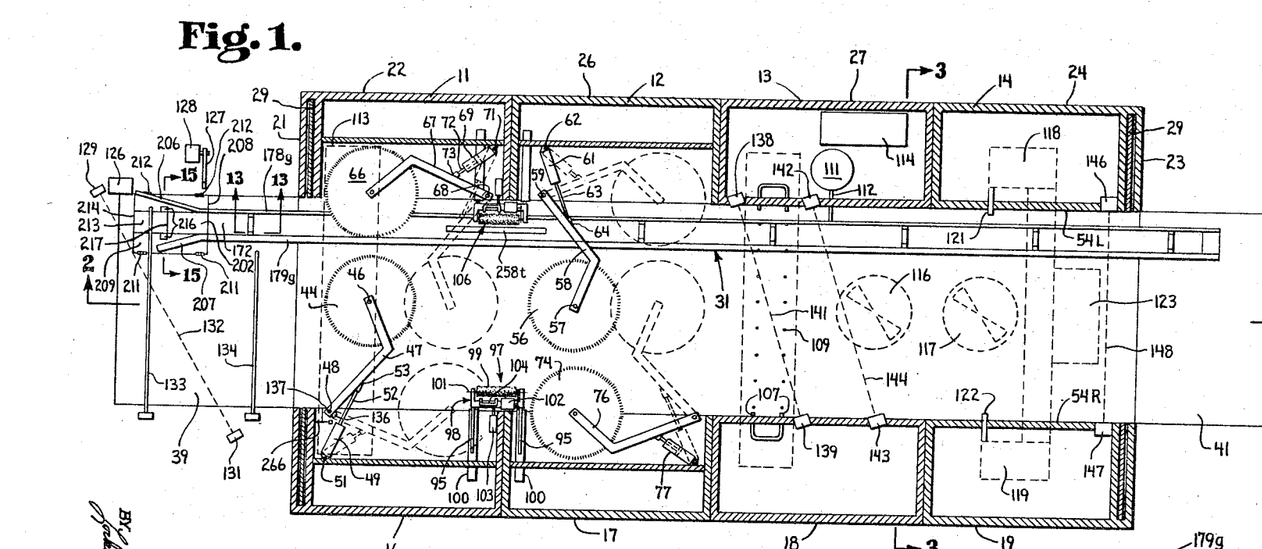
FIG. 1 is a top plan view of the apparatus according to a typical embodiment of the present invention but omitting the top brush assembly, roof and roof supporting structure, some of the roof mounted units including portions of the pre rinse and fresh water rinse apparatus and dryer blowers being designated by dotted outlines.

Referring now to the drawings in detail, and particularly to FIG. 1, the illustrated building is made up of two horizontally spaced rows of cubicles, the first row including the cubicles 11, 12, 13, and 14, and the second row including cubicles 16, 17, 18, and 19. The cubicles are illustrated as units having at least three solid walls, but they may actually be manufactured in a variety of ways so long as the outer walls of the front end cubicles and rear end cubicles of both rows are closed to provide covered front and rear building walls, respectively. For example cubicle 11 will provide an exterior front building wall 21 and an exterior side building wall 22. Cubicle 14 will provide a rear building wall 23 and exterior side building wall 24. The intermediate cubicles such as cubicles 12 and 13 in the first row need only have their outer walls closed to provide integral exterior side building walls 26 and 27, respectively. These exterior walls are typically provided in each cubicle of the existing apparatus by securing corrugated sheet metal or plastic sheeting to a metal framework.

Each of the cubicles also has its own roof and the space between two rows of cubicles, through which the car passes as it is washed, is spanned by additional roofing, thus completing the exterior of the building. Sliding doors 29 are provided in the cubicles at the ends of the building whereby a complete enclosure is obtained when the doors are closed. By way of example, the dimensions of each cubicle may be 8 feet high, 8 feet long and 4 feet wide. Thus the overall length of the building is approximately 32 feet.

Figure 3:
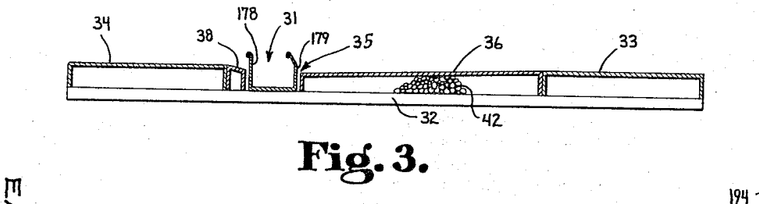
FIG. 3 is a fragmentary cross section therethrough taken at the line 3—3 in FIG. 1 and omitting everything above the floor support and conveyor support framework, and omitting some of the interior features of the conveyor.

A conveyor 31 is provided and extends through the building for receiving the left hand wheels of a car and moving the car through the building. It may be preferred to furnish the apparatus so that no trenches need be provided in the pavement or other ground surface at the car wash site. Therefore a floor assembly can be provided in the building as shown in FIG. 3. This floor assembly may be constructed of horizontally spaced cross members 32, to which superstructure framework 33 is attached on the right hand side and is connected to cubicles for supporting the cubicles in the right hand or second row, and to which superstructure 34 is attached on the left hand side for connection to and support of the cubicles of the first or left hand row. Floor plates 36 and 38 may be provided, supported by the members 32, and are arranged to provide a trench 35 in which the lower portion of the conveyor 31 is received. If it is not objectionable to provide a trench in the pavement or other ground supporting surface, the floor structure can be omitted, a trench provided in the concrete, and the cubicles can be set directly on the ground.

Where the structure of FIG. 3 is employed, an approach ramp 39 may be provided at the front of the building and a departure ramp 41 may be provided at the rear of the building, these ramps having their lower ends on the pavement at the site and the upper ends flush with the floor plates in the building. If it is desired to do so to minimize floor plate supporting structure, crushed stone or other ballast 42 can be provided under the floor plate.

Referring further now to the drawings, four electrically driven brushes, rotated on vertical axes, are provided for washing the front, side, and rear of the automobile, and a fifth brush assembly is provided for washing the hood, top, and deck lid. Each of the four brushes operating on vertical axes is mounted to an arm assembly supported in a modified cantilever arrangement. For example first brush 44 is mounted to the vertical shaft 46 supported by a frame 47 pivotally mounted to the cubicle 16 on a vertical hinge shaft having an axis at 48. A pneumatic cylinder 49 is pivotally mounted at 51 to the cubicle 16 and has the piston rod 52 pivotally connected at 53 to the frame 47. Air pressure is normally applied in cylinder 49 to keep the brush 44 extended from the cubicle so that it is out in the tunnel directly in front of the car as it approaches the building. The brush axis is usually to the left of the longitudinal center line of the tunnel, this center line being between the horizontally spaced vertical planes 54L and 54R defined by the inner margins of the two rows of cubicles. In like manner, brush 56 is mounted for rotation on a vertical axis 57 at the outer end of the frame 58 pivotally mounted at 59 to cubicle 12. The pneumatic cylinder 61 pivotally mounted at 62 to the cubicle 12 is provided with a piston rod 63 pivotally connected at 64 to the frame 58, and air is normally applied in this cylinder so as to hold the brush 56 at or near the center of the tunnel. Brush 66 is mounted to the frame 67 in the same way as brushes 44 and 56 are mounted to their respective frames, and frame 67 is pivotally mounted at 68 to cubicle 11. A pneumatic cylinder 69 pivotally mounted at 71 to the cubicle 11 has a piston rod 72 pivotally mounted at 73 to the frame 67. Pressure applied to one side of this piston normally retains the brush 66 in a retracted position such that the rotational axis thereof is outside of the tunnel and within the cubicle 11. In like manner, brush 74 is pivotally mounted at the outer end of the frame 76 which pivotally mounted to cubicle 17 and is operated by a pneumatic cylinder 77. Cylinder 77 also normally retains the brush 74 in a retracted position.

Figures 4, 5, 6, 7:
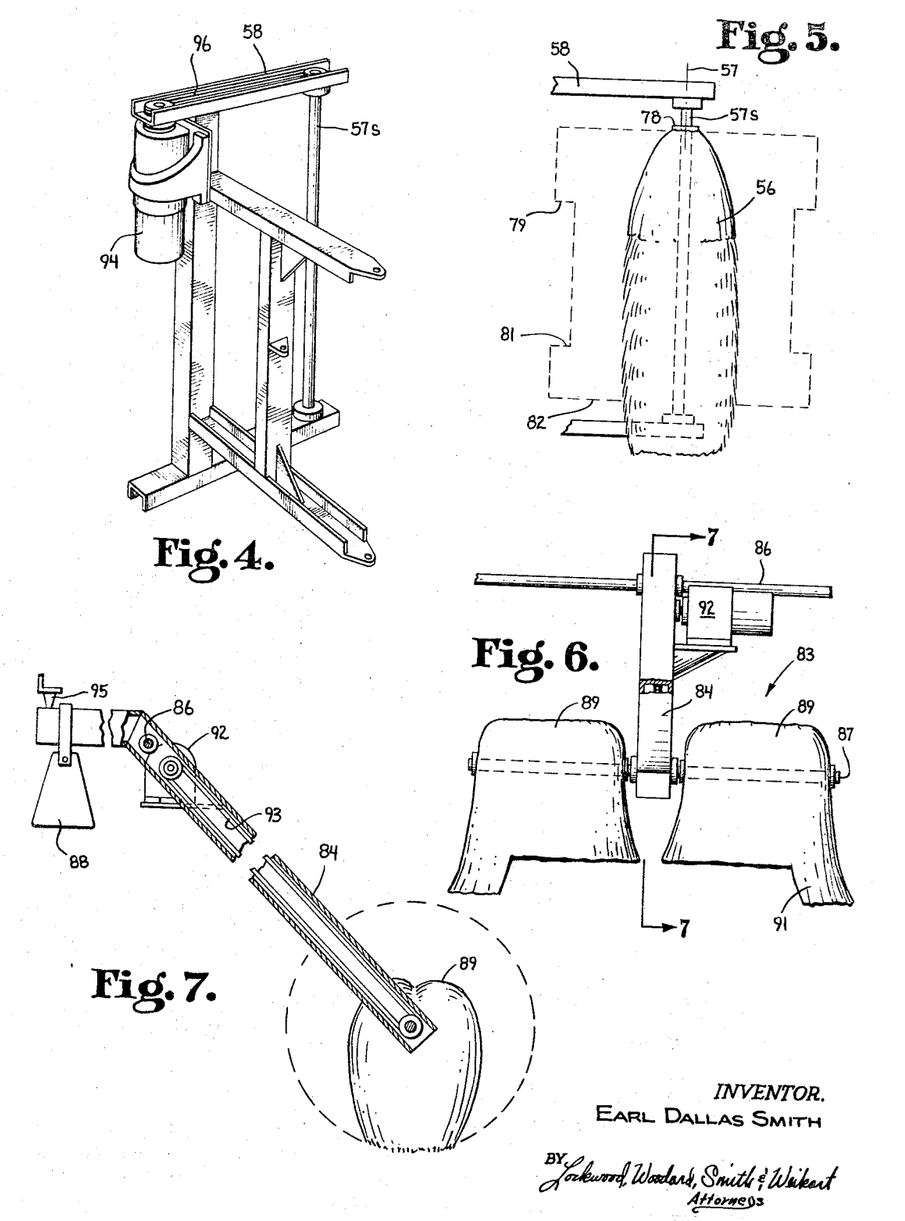
FIG. 4 is an enlarged perspective view of the left front brush support frame, with the brush removed.
FIG. 5 is a fragmentary enlarged elevational view of the left front brush support frame with the brush mounted thereto but not rotating.
FIG. 6 is an enlarged fragmentary elevational view showing the top brushes and support frame and drive motor therefor.
FIG. 7 is a section taken along the line 7—7 in FIG. 6 and viewed in the direction of the arrows.

Each of these four brushes is of the same general type of construction and, as better illustrated in FIG. 5, brush 56 is mounted to the frame 58 by means of the vertical shaft 57s. Each brush is constructed of long fibre bristles which, when the brush is not being rotated, droop as illustrated in FIG. 5. However the bristles are cut to lengths such that when the shaft 57s is rotated at a sufficient speed, an upper group of bristles extending from the top 78 of the brush down to a horizontal plane 79 extend to a greater diameter than does the intermediate group of bristles between plane 79 and plane 81. Then the lower group of bristles between plane 81 and the bottom 82 of the brush extends out to the same diameter as does the top group of bristles. The brushes are operated at a speed just sufficient to extend the bristles in this manner, and yet minimize wear on the brushes and avoid excessive throwing of water. The purpose of this arrangement of the bristles will be better understood when the operation of the apparatus is described.

Figure 2:
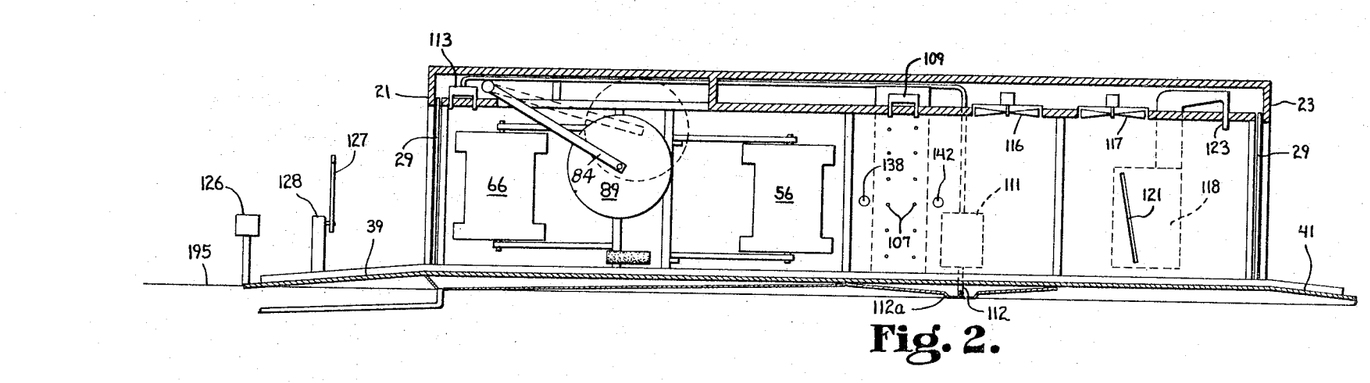
FIG. 2 is a cross section therethrough taken along a vertical plane containing the longitudinal center line of the tunnel and identified by the lines 2—2 in FIG. 1, and viewed in the direction of the arrows.
Figure 8:
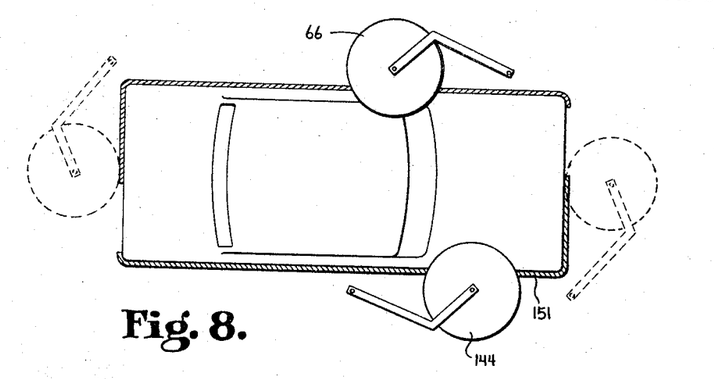
FIG. 8 is a schematic top plan view illustrating application of the right front and left rear brushes to the vehicle and showing by the dotted outlines the starting position of the right front brush on the vehicle and the finishing position of the left rear brush with respect to the vehicle.

The fifth brush unit 83 includes an overhead support arm 84 pivotally mounted to a transverse overhead shaft 86 and having a brush support shaft 87 at one end thereof and a counter weight 88 at the other end thereof. Two brushes 89 are mounted to the shaft and are of the same general construction as brush 56. However each of these brushes 89 has long bristles 91 at the outer portion thereof and the remaining bristles are of uniform shorter length. An arm-mounted electric gear drive motor 92 is provided for these brushes and suitable connecting means such as belts 93 can be provided. This is similar to the provision of the gear drive motor 94 and belt drive 96 for the brush shaft 57s of FIGS. 4 and 5. The brush assembly 83 is so balanced that the brush end is heavy and is normally down and may be supported by a roof mounted rubber stop 95 in the position shown in FIGS. 2, 7 and 8. As will later be described, the action of the car pushes upwardly on the brush so that it follows the top contour of the car as the car passes under the brush.

Additional brush units are provided for the wheels. However these brushes have stiff bristles. In view of the fact that each of these brush units is basically the same as the other, except for the extent of travel of its frame, only one will be described. Wheel brush unit 97 includes a frame 98 to which a brush 99 is rotatably mounted on a horizontal axis 101. Suitable motor drive 102 for the brush is provided and a pneumatic cylinder 103 is provided in cubicle 16 so that when the vehicle wheel comes abreast of the brush, the actuator will push the brush away from the cubicle until the brush engages the wheel with the proper pressure. A tube with spray nozzles 104 is provided to spray the wheel with water, soap, and whitewall cleaner solution. The length of the brush from end to end is approximately equal to the circumferential distance around the tread of the tires of standard sizes automobiles. The rails 95 of the brush frame may be received in guide tubes 100 fixedly mounted in the cubicles to support the frame as it is pushed in and out by the pneumatic cylinder 103, or they may be mounted on floor tracks or in any other suitable way. Brush unit 106 is essentially the same as unit 97.

Additional equipment employed in the apparatus includes fresh water rinse nozzles 107 provided in cubicles 13 and 18, these nozzles being arranged to direct generally horizontal sprays on the vehicle. Additional fresh water rinse nozzles 109 are provided across the ceiling between cubicles 13 and 18. The floor plates 36 and 38 in the space between cubicles 13 and 18 are inclined downwardly toward the trench or trough provided in the floor (FIGS. 2 and 3) and in which the conveyor 31 is disposed, so that the rinse water is discharged into this trough. A water pump 111 has a suction line 112 into the sump 112a provided in the trench between cubicles 13 and 18 and discharges into a set of prerinse nozzles in the prerinse assembly 113 extending across the ceiling between the front cubicles 11 and 16. An air compressor 114 is provided to supply air through solenoid valves to the pneumatic cylinders. Overhead blower fans 116 and 117 are provided in the ceiling between the last two pairs of cubicles, respectively, and blower units 118 and 119 are provided in the rear end cubicles, with horizontally discharging nozzles 121 and 122, respectively and a downwardly discharging nozzle 123.

Controls in general

Many of the controls are of conventional type. A coin operator 126 is provided at the front end of the entrance ramp and is useful to open the gate 127 mounted to the upper end of the post 128 and normally extending across the ramp. An electric eye combination 129–131 provides a beam 132 across the area under the gate so that the gate will not be closed until the vehicle entering on the ramp has passed completely through. A pneumatic or pressure switch operator tube 133 lies across the ramp 39 just in front of the gate and is used to start the conveyor after the gate is open and the vehicle is driven forwardly to run the front wheel over the tube.

Each of the horizontally swingable brush support frames has one or more cams thereon or on the hinge shaft thereof, operating a limit switch such as limit switch 266 affixed to cubicle 16 and operated by the cam 136 on hinge shaft 137 affixed to frame 47. The other cams and limit switches are not shown on the various arms, in order to simplify the drawings. The functions thereof, however, will be described hereinafter.

A set of electric eyes 138–139 is provided in cubicles 13 and 18, establishing a beam 141 across the area between the horizontal spray nozzles 107 and vertical spray nozzles 109, to control this fresh water rinse spray unit and the overhead blowers 116 and 117, and keep them in opertaion while the vehicle is moving in the space covered by these nozzles. Another set of electric eyes 142–143 establishes a beam 144 in the drip area to the rear of the fresh water rinse unit, to start a timer for the side blowers 118 and 119 for removing excess water from the vehicle and drying it. Electric eyes 146–147 establish a beam across the rear end of the tunnel in the building to keep the side blower units operating until the vehicle has departed.

Brush action

The detailed operation of the car washing apparatus may be best understood if the action of the brushes is first described. As mentioned previously, brush 44 is normally disposed in the center of the tunnel and it is this brush which is first contacted by the vehicle as it is moved through the tunnel by the conveyor. This brush is moved in the direction of the arrow 149 against a predetermined resistance provided by the pneumatic cylinder 49. This brush is effective to clean the front end of the car from a portion to the left of center around the right front and along the right side as the car moves through the building. For this reason the brush is referred to as the right-front brush. The portion of the vehicle which it cleans is indicated by the sectioned strip 151 in FIG. 8. As the car moves through, the right-front brush 44 is moved from the position shown by the solid outline in FIG. 1 (dotted outline in FIG. 8) to the position shown by the solid outline in FIG. 8 (dotted outline in FIG. 1), where the brush is partially retracted into the front cubicle 16. It continues to operate when in this position to clean the right hand side of the vehicle from the front end to the rear end.

Figure 10:
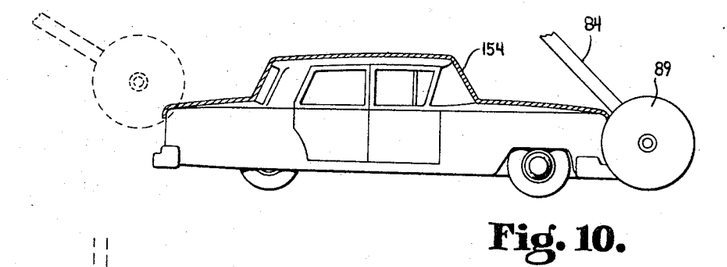
FIG. 10 is a schematic elevational view showing the starting position of the top brush with respect to the vehicle and showing by dotted outline the finished position of the top brush with respect to the vehicle.

The next brush to engage the vehicle after the right front brush is brush 66, which is controlled by the cylinder 69 and engages the left hand side of the vehicle very lightly as the vehicle moves along and contacts the right front brush. However the cylinder 69 does not provide any outward force until a predetermined time after pivoting of the right-front brush, so that force is applied only after the windshield has reached a position abreast the center of rotation of the brush 66. This avoids any damage to a left front fender mounted antenna of the car. The cylinder 69 then forces the brush 66 against the left side of the car with sufficient force that as the car passes the center line of rotation of the brush, the brush moves inwardly toward the center of the tunnel to the position shown by the dotted outlines in FIGS. 1 and 8. The brush thereby cleans the left rear portion of the car as well as the left side and is therefore referred to as the left-rear brush. When the front end of the car engages the top brushes 89, it will begin to lift them and the arm 84 to which they are attached, and these brushes will follow the top contour of the car. The brushes will clean the top of the hood and, because of the long bristles at the outer edges thereof, will clean the entire expanse of the top of the car and yet enable the length of the shaft 87 to be sufficiently narrow to avoid any possibility at all of striking fender mounted antennas, even if the antennas are extended. Also the side bristles 91 will work down the sides of the portion of the car above the belt line 153. Thus the top brush will cover the portion of the car indicated in FIG. 10 by the section line 154.

Figure 9:
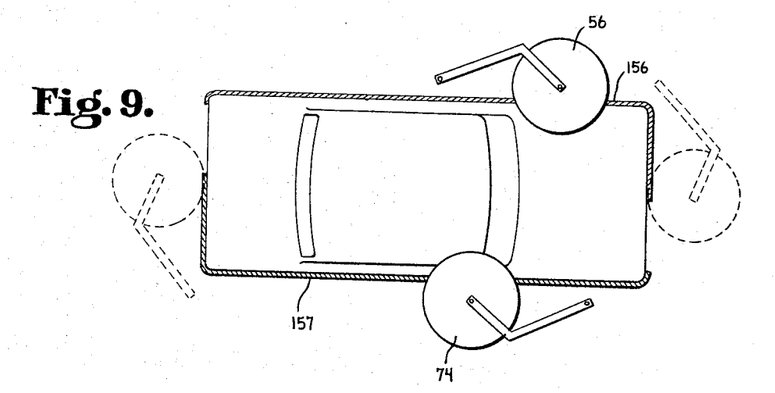
FIG. 9 is a top plan schematic view showing application of the left front brush and right rear brush to the vehicle and showing by the dotted outlines the starting position of the left front brush with respect to the vehicle and the finishing position of the right rear brush with respect to the vehicle.

The next brush to be encountered after the top brush is encountered by the front end of the car, is the brush 56. This brush cleans the front end of the car from a point beginning slightly to the right of center and then is moved outwardly as the car moves through, and cleans the left front and side of the car over an area as indicated by the sectioned area 156 in FIG. 9. This brush is therefore referred to as the left front brush.

At a predetermined time interval after the left front brush is moved outwardly by the car, the right rear brush 74 is pushed inwardly by the cylinder 77 therefor, and cleans the right side of the car from the point behind the windshield around to a point to the left of center of the rear end of the car. This area is indicated by the sectioned area 157 in FIG. 9. Neither the left rear nor the right rear brush is forced outwardly by the cylinder therefor until after the area immediately in front of the windshield has passed, so that there is no chance at all of any damage to front fender mounted antennas. Also, the cleaning of the front portions of the car which are lightly engaged by these brushes as the car passes them initially, has already been accomplished by the front brushes, and these rear brushes therefore merely lightly pass over this area.

It is believed that the significance of the long and short bristles of the brushes will now be more readily apparent. The lower bristles of the right front and left front brushes are effective to clean any splash pans which may be provided below the bumpers in the front of the vehicle. The overall height of these brushes is typically 3 feet and the extra length of the lower portions of the brushes is effective not only to clean these splash pans but also to clean the rocker panel and the lower side portions of the car which, in many cars, are curved inwardly. The extra length of the bristles near the upper ends of these brushes is effective to better clean the usual inwardly curving top portions of front and rear fenders. Yet they do not present any hazard to antennas.

Figure 11:
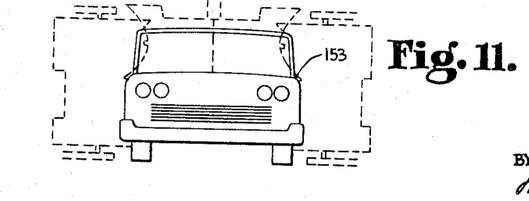
FIG. 11 is a front elevational schematic view illustrating the relationship of the rear brushes and top brushes to show how complete coverage of the vehicle is assured.

The left and right rear brushes, which are normally about 4½ feet high are thereby better able to clean the side windows, even when the windows are substantially recessed between door frames and posts. The longer bristles near the top portions of the brushes above the belt line, as best indicated in FIG. 11, are quite effective for this purpose. Again, the greater extension of the lower bristle is effective to clean rocker panels and also to clean splash pans under the rear bumpers of the car.

Conveyor construction

Figure 14:
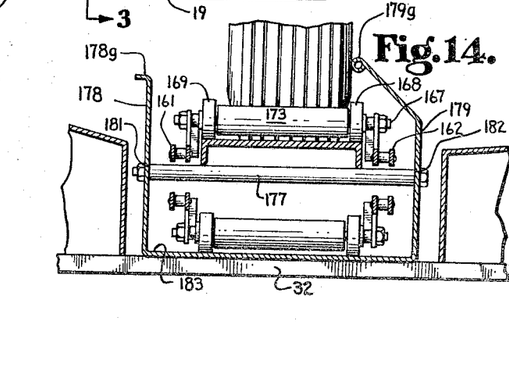
FIG. 14 is an enlarged fragmentary sectional view taken along the line 14—14 in FIG. 13 and viewed in the direction of the arrows.
Figure 15:
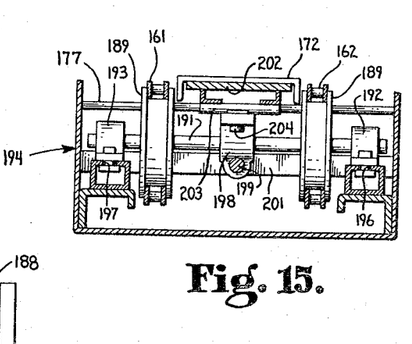
FIG. 15 is an enlarged sectional view through the conveyor idler support box taken along the line 15—15 in FIG. 1 and viewed in the direction of the arrows.

The conveyor will now be described in detail. The conveyor includes two endless chains 161 and 162 (FIGS. 14, 15) which are of identical construction, so only one will be described. The chain may be of conventional roller chain construction including roller links 163 and pin links 164. However the word "roller" where it appears hereinafter, will not refer to the standard chain rollers but to the other rollers employed on the conveyor which will be described. At spaced points along the length of the chain, certain of the standard chain link plates are replaced by support link plates 166 which, in addition to serving the usual function of chain link plates, also serve to support the outer end of a roller assembly drive shaft 167. The support link of the chain on the opposite side of the conveyor supports the other end of each of these shafts.

Each of the shafts 167 has a pair of support rollers 168 and 169 mounted thereto for rotation thereon. These rollers roll along the top surface 171 of a conveyor table 172 which is stationary and is supported in a manner which will be described hereinafter. These support rollers serve to support the shafts 167 and thereby support the upper runs of both chains. Each shaft also has mounted thereon an idler roller 173 which is freely rotatable on the shaft and is spaced above the upper surface 171 of the conveyor table. It is these rollers 173 which engage the tread 174 of the left front wheel of the automobile when it is driven upon the conveyor table and serve to push the vehicle forward from the front end of the building to the rear end of the building in the direction of the arrow 176.

The conveyor table 172 is supported by a plurality of horizontally spaced support spacer bars 177, each of which has its opposite ends supported by the upstanding conveyor rails 178 and 179. Conveyor rail 178 extends along the left hand side of the conveyor throughout its length and rail 179 extends along the right hand side throughout its length. These rails are properly spaced, both by shoulders 181 and 182 adjacent the opposite ends of the spacer bars 177, and by a lower plate 183 which extends throughout the major portion of the length of the conveyor and serves as a return table along which the support rollers 168 and 169 roll in the direction of the arrow 184, thus supporting the lower run of each of the two chains.

Figure 12:
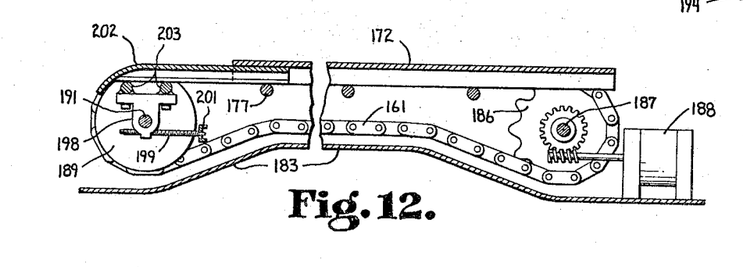
FIG. 12 is a longitudinal sectional view of the conveyor chain and drive means therefor with the central portion deleted to conserve space in the drawing.
Figure 13:
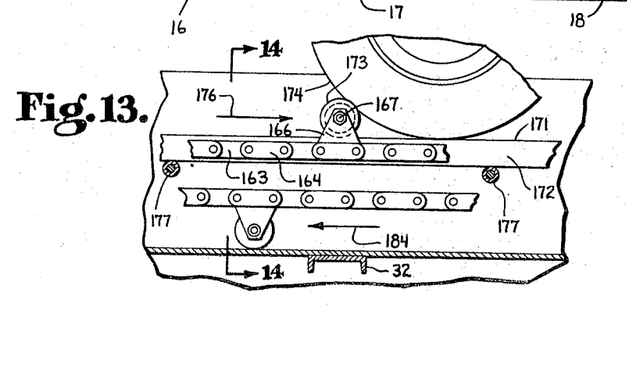
FIG. 13 is an enlarged fragmentary side elevational view of the conveyor such as it would appear when viewed at the area designated by the line 13—13 in FIG. 1 and viewed in the direction of the arrows, a portion of the lower conveyor table and support bar therefor being shown in section, and a vehicle wheel being shown on the upper conveyor table driven by one of the idler rollers.

Each chain is driven by a sprocket at the exit end of the building, such as sprocket 186 for chain 161 (FIG. 12). Both sprockets are secured to the main drive shaft 187 which may be driven by the conveyor drive motor 188, through suitable gearing.

Novel means are provided at the entrance end of the conveyor for adjustment of the chain slack and for access to the adjustment means. The chains are supported at the front end of the building by two idler flanged wheels 189 (FIG. 15) which are affixed to the shaft 191 which is supported at its outer ends by the bearings 192 and 193. This assembly is received and supported in an upwardly opening idler pit box 194 resting on ground surface 195 and which is connected to the ends of the conveyor rails 178 and 179. The bearings 192 and 193 are mounted in the box so that they can move fore and aft in the slots 196 and 197, respectively.

A pillow block 198 is threadedly received on the shaft 191 and has an adjustment screw 199 thereon, a portion of which is received in a cross member 201 of the box. By turning this screw, the position of the idler shaft 191 lengthwise of the conveyor can be varied as required to adjust chain tension.

In order to be certain that the conveyor table is of a length consistent with the chain length, a conveyor table extension 202 (FIGS. 1, 12 and 15) is provided and has two longitudinally spaced cross members 203 bolted to the mounting face of pillow block 198 by means of the bolts such as 204. The rear end of this conveyor table extension 202 is received on one of the spacer bars 177 (FIG. 12) and supported thereby immediately under the lower face of the main conveyor table. Therefore as the idler shaft 191 is moved forward and rearward with respect to the building to adjust chain tension, so is the conveyor table extension which covers the idler shaft.

The upper marginal portion 178g of conveyor rail 178 is curved outwardly and the upper marginal edge 179g of the rail is curved also. The spacing between the upper edges of the rails is such that the vehicle tire will not get off the conveyor. As best shown in FIG. 1, outwardly flared extensions 206 and 207 are provided for conveyor rails 178 and 179, respectively at the entrance to the conveyor so that they serve to guide the tire onto the conveyor table as the automobile is driven onto the conveyor. In order to obtain access to the conveyor chain idlers and adjustments therefor, these rail extensions are separate from the rails themselves at the line 208 in FIG. 1 and each extension is mounted to a hinged plate. For example, rail extension 207 is secured to the flat plate 209 which is hinged at 211 to swing upwardly and outwardly. It is hinged to the box 194. Similarly the rail extension 206 is hinged at 212 to the box 194. A center plate 213 has its front end portion 214 supported on the box and the rear end portion is supported by the outwardly extending tabs 216 resting on top of portions of the hinged plates. In this way the member 213 can be moved forward or rearward as required, so that upon movement of the conveyor table extension 202 no gap need exist at 217 between the plate 213 and conveyor table extension 202.

Electrical system

Figure 16A:
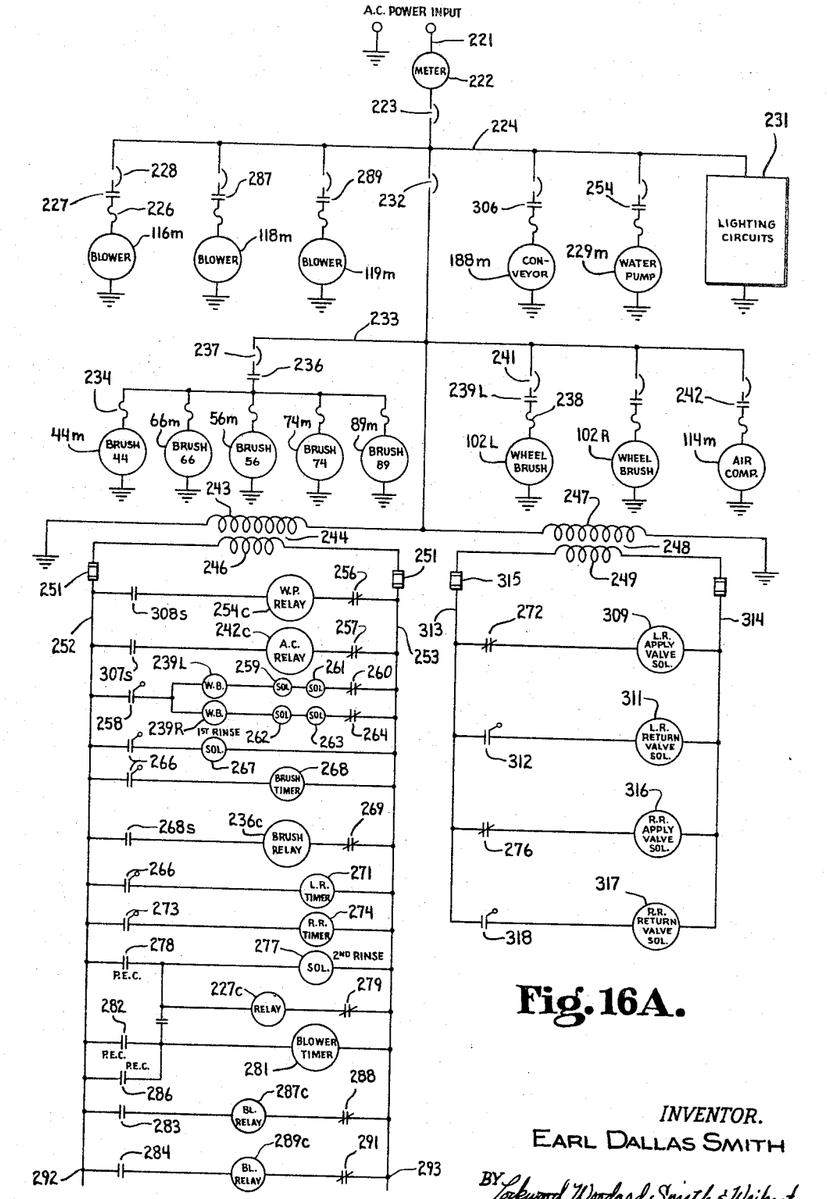
FIGS. 16A and B are two parts of a schematic diagram of the electrical control circuit for the apparatus.

Referring now to the electrical diagram of FIG. 16 in detail, electrical energy is applied from the external power line 221 through the utility meter 222 to the circuitry in the building. Usually this is a 220 or 440 volt, three phase, 60 cycle alternating current supply. However for convenience in illustration, it is shown as only a single phase supply. A primary circuit breaker 223 is provided between the meter and the main panel bus bar 224.

Three blower motors are connected to this bus bar, each being assigned the same reference numeral as appears in FIG. 1 with a postscript $m$, for operating the corresponding blower or fan units. Each is connected through an overload switch, a motor control switch and a circuit breaker to the bus bar, these switches for motor 116$m$ being given the reference numerals 226, 227 and 228, respectively. The conveyor motor 188$m$ and water pump motor 229$m$ are connected to the bus bar 224 in the same way. A lighting circuit panel board 231 is also connected to the bus bar. For the typical building, it is wired for eight lighting circuits.

The bus bar 224 is connected through another circuit breaker 232 to the motor control center bus bar 233. Five gear motors are employed, one for each of the five vehicle body washing brushes, these motors being given the same reference numerals as the brushes which they drive, but each having a postscript $m$ thereafter. Each of these motors is typically a 1½ horsepower three phase motor and is connected through an overload switch 234, the brush timer relay switch 236 and circuit breaker 237 to the bus bar 233. The one brush timer relay switch 236 serves to simultaneously energize or deenergize all five of the brush drive motors.

Each of the wheel washer brush drive motors such as motor 102L for the left-hand wheel brush is connected through an overload switch 238, wheel brush motor relay switch 239 and a circuit breaker 241 to the bus bar 233. Similarly an air compressor motor 114$m$ is connected through an overload switch, the air compressor motor relay switch 242 and a circuit breaker to the bus bar 233.

The bus bar 224 is also connected to the primary winding 243 of a first step down transformer 244 which steps down the voltage to 24 volts at the secondary winding 246 thereof. Similarly the bus bar 224 is connected to the primary winding 247 of a second step down transformer 248 which steps down the voltage to 10 volts in its secondary winding 249. The various control circuits connected to the step down windings of these transformers, will now be described.

Through the fuses 251, the winding 246 of the first transformer provides 24 volts across the lines 252 and 253. Beginning at the top of the diagram, the water pump relay controller 254c is in a series connection with the manually operated switch 256 and the normally open pump control relay switch 308S across the line. Similarly the air compressor relay controller 242c is in series with the manually operated switch 257 and the normally open compressor control relay switch 307S across the line 252 and 253. A wheel washer control switch 258 is connected in series with the left wheel washer motor relay controller 239L, the left wheel rinse and soap control valve solenoid 259, the left wheel brush frame pneumatic actuator supply valve solenoid 261, and a manual switch 260, this series combination being connected across lines 252 and 253. The right wheel brush motor controller 239R, rinse and soap valve solenoid 262, wheel brush support frame pneumatic actuator supply valve solenoid 263 and manual switch 264 are also connected in series with the wheel brush control switch 258, across the lines 252 and 253. Switch 258 may be a pressure switch connected to a pneumatic operator tube 258t on the conveyor table (FIG. 1) at the location of the wheel brushes for actuation by the left vehicle wheels as they move along, remaining actuated until the wheel moves away from the wheel brush means.

The normally open limit switch 266, mounted to cubicle 16 and closed by the cam 137 on the first brush frame hinge shaft as soon as the frame is moved rearwardly by the vehicle, is connected in series with the solenoid 267 for the first rinse control valve. As soon as this switch is closed, solenoid 267 is energized whereby the pre rinse 113 is turned on.

Switch 266 is also in series with a body brush timer 268, this combination being connected across the lines 252 and 253. Thus when this switch is closed it starts the timer 268. The brush timer 268, when activated and during the predetermined time period thereof, closes the brush timer switch 268s which is in series with the brush motor relay controller 236c and the manually operated switch 269, this series combination being connected across the lines 252 and 253.

Limit switch 266 is also connected in series with the left rear arm timer 271 which, after a predetermined length of time closes the left rear arm timer switch 272 in the secondary circuit of the second step down transformer 248. That switch then remains closed for a predetermined period of time, as determined by the timer, it then is opened.

A limit switch 273 is mounted to cubicle 12 and is operated by the left front brush in the same way that switch 266 is operated by the right front brush. This switch 273 is in series with the right rear arm timer 274 which, after a predetermined time subsequent to energization closes the right rear arm timer switch 276 in the secondary circuit of the second step down transformer 248, and keeps it closed for a predetermined period of time and then opens it.

The valve solenoid 277 for the second rinse unit 107–109 is in series with a normally open switch 278 operated by a photocell controlled by the beam 141 between the units 138 and 139 in the tunnel between the next-to-last cubicles 13 and 18. When the vehicle breaks this beam, switch 278 is closed to energize the valve solenoid 277 and activate the fresh water rinse unit.

The relay controller 227c for the blower motor 116m is in series with the manually operated switch 279 and photocell switch 278 to operate the blower while the fresh water rinse unit is operating.

For the side blowers, a timer 281 is in series with a normally-open photo-electrically controlled switch 282 operated by the light beam 144 between the units 142 and 143 in the cubicles 13 and 18, respectively. This blower timer is operable, when actuated, to close the blower control switches 283 and 284. Another normally-open, photo-electrically operated switch 286 is also connected in series with the timer 281 across the lines 252 and 253 to keep the timer 281 actuated so long as the car remains in the tunnel, switch 286 being operated by the beam 148 between units 146 and 147 in the rear end cubicles 14 and 19.

The blower timer switch 283 is in series with the left blower motor relay controller 287c and a manual switch 288 across the lines 252 and 253. Similarly the blower timer switch 284 is in series with the right blower motor relay controller 289c and manual switch 291 across the lines 252 and 253. The manually operated switches 256, 257, 262, 264, 269, 279, 288 and 291 are merely for precautionary purposes and are normally closed during the entire operation of the apparatus.

The next two circuit branches below the junctions 292 and 293 on lines 252 and 253, (FIG. 16B) respectively, provide for the coin operated automatic control of the apparatus. The first circuit branch includes a normally-open coin operated switch 294 in the coin operator stand 126 of FIG. 1. This switch is in series with a gate motor relay controller 296 and two switches 298 and 299 in a combination across the lines 252 and 253. Switch 298 is a normally-closed limit switch mounted to cubicle 16 and opened by the right front brush support arm 47 when the brush is moved away from its original starting position at the center of the tunnel. Similarly, switch 299 is a normally-closed limit switch mounted to the cubicle 26 and opened by the left front brush support arm 58 when the left front brush is moved away from its original starting position in the center of the tunnel. If both of these brushes are out in starting position, these switches 298 and 299 are closed so that dropping a coin in the slot will close the switch 294 and energize the gate motor to lift the gate.

To keep the gate lifted so long as a car remains under it, a normally-open photocell operated switch 297 and a normally-open gate operated switch 301 are connected in series across the coin switch. Switch 297 is closed when the beam 132 between the units 129 and 131 of FIG. 1 is broken by the car, and switch 301 is closed so long as the gate is up. Thus when the coin operated switch 294 has reopened, the gate will remain up so long as the car remains in position breaking the beam, but when the beam is broken, the gate motor relay controller is deenergized and the gate will drop.

A normally-open, pneumatically operated switch 302 is in series with the conveyor timer 303 across the lines 252 and 253. Switch 302 is closed when the pneumatic tube 133 across the approach ramp in front of the conveyor is crossed by the left or right front wheel of the vehicle. When the timer 303 is initiated, it closes a conveyor timer switch 304 in series with the conveyor motor relay controller 306c, the air compressor switch controller 307c and the water pump switch controller 308c, which combination is connected across the lines 252 and 253. These three motors are, therefore, energized as long as the conveyor timer keeps the switch 304 closed, which is long enough for a vehicle to be moved completely through the tunnel and out the rear end and off the conveyor.

To control the air supply to the pneumatic cylinders 69 and 77 for the left rear brush frame and right rear brush frame, respectively, two solenoid valves may be employed. For each valve, actuation in one direction will apply air to one side of the piston in the cylinder and actuation in the other direction will apply air to the other side of the piston in the cylinder and vent it from the one side. Considering FIG. 16 further, to apply pressure to the cylinder 69 in a direction advancing the left rear brush arm, the solenoid 309 in circuit with the switch 272 is employed. To shift the valve and vent the "apply" side of the piston and pressurize the return side of the piston in actuator 69, the solenoid 311 is employed in series with the normally-open limit switch 312. These series combinations are connected across the lines 313 and 314 supplied by the secondary winding 249 of the second step-down transformer 248 through the fuses 315. For the right rear arm, the arm apply solenoid 316 is connected in series with the switch 276, and the arm return solenoid 317 is connected in series with the normally-open limit switch 318.

Switch 312 may be connected to or mounted on cubicle 22. It is closed by the left rear brush arm 67 or a cam on the shaft thereof when the arm has moved the brush out to the center of the tunnel, whereupon solenoid 311 is energized and shifts the valve, applying pressure to the "return" side of the piston in cylinder 69 and retract the arm back into the cubicle. Prior to this time, of course, the left rear arm timer switch 272 has been opened by the timer 271, deenergizing the solenoid 309, and allowing the valve to be shifted back by solenoid 311 when the latter is energized.

The same arrangement is provided for the right rear arm solenoids, the switch 318 being mounted to the cubicle 17 and closed when the arm has swung out to position the brush at or beyond the center of the tunnel. Thereupon the solenoid 317 is energized to shift a valve causing the piston in pneumatic cylinder 77 to return the arm 76 to the retracted position in the cubicle 17.

Figure 16B:
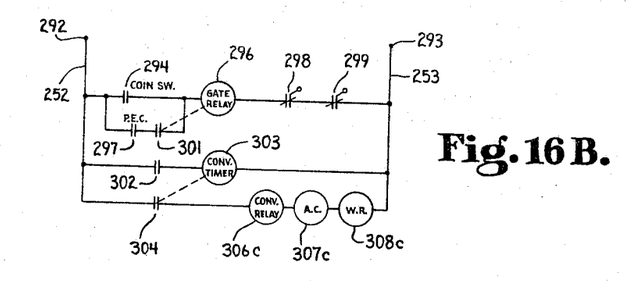
Figure 17:
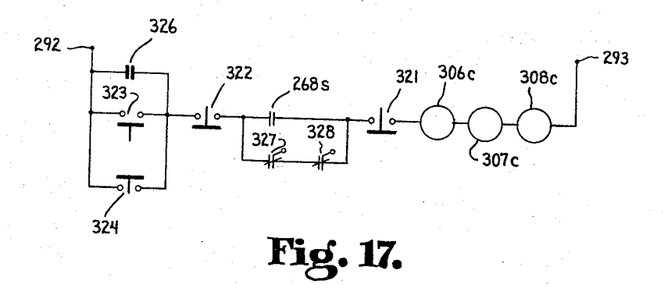
FIG. 17 is a fragmentary electrical schematic diagram showing the portion to be substituted for the circuitry of FIG. 16B in the event manual conveyor control is desired instead of the completely automatic coin operated control illustrated in FIG. 16B.

Referring now to FIG. 17, there is shown a manual control for the conveyor, which may be used instead of the automatic coin operated control, if desired. For this purpose, the portion of the circuit below the junctions 292 and 293 which is shown in FIG. 16B is deleted, and the arrangement shown in FIG. 17 is substituted therefor. In this arrangement, the controllers 306c, 307c, and 308c, for the conveyor motor, air compressor motor, and water pump motor, are connected in series with a stop switch 321 at the rear end of the building, the brush timer switch 268s, a stop switch 322 at the front end of the building, and the parallel combination of a start switch 323 at the front end of the building, start switch 324 at the rear end of the building and a capacitor 326. Because the brush timer switch 268 is open until the brush timer is actuated by the right front limit switch by the vehicle pushing the right front brush rearwardly, the conveyor cannot be started unless the switches 327 and 328 connected in series across switch 268s, are closed. Switch 327 is a limit switch mounted, like limit switch 312, to cubicle 22 but, in contrast with switch 312, this switch 327 is closed only when the left rear arm 67 is retracted into cubicle 22. Similarly, the switch 328 is mounted in cubicle 17 and is operable by the right rear brush support arm 76, but is closed only when this arm is retracted into cubicle 17. This assures that the conveyor will not be started until the left and right rear conveyor brushes have moved out of the center of the tunnel and their arms are retracted into the cubicles. Switches 327 and 328 may be either the normally-open or normally-closed (as shown) types so long as the cams therefor are arranged to assure that they are opened if the brush arms with which they are associated, are not retracted.

Closure of either of the start switches will start the conveyor if both of the stop switches are closed. If either stop switch is opened at the front or rear end of the building, the conveyor will stop.

From the foregoing description, it is believed apparent that the present invention makes possible a completely automatic and foolproof car wash establishment which can be readily positioned on any available comparatively flat supporting surface where a sewer is available, a water supply is available and electric power is available. Thus it lends itself readily to installation in many locations which were heretofore unsatisfactory for the installation of the usual car wash establishment. They are also constructed at a much lower cost which not only minimizes initial investment but also minimizes their valuation for tax purposes.

While the invention has been disclosed and described in some detail in the drawings and foregoing description, they are to be considered as illustrative and not restrictive in character, as other modifications may readily suggest themselves to persons skilled in this art and within the broad scope of the invention, reference being had to the appended claims.

The invention claimed is:
1. A car washing apparatus comprising:
a first plurality of cubicles connected together in a first row, and a second plurality of cubicles connected together in a second row, said first and second rows being spaced apart to permit passage of an automobile vehicle therebetween, said cubicles being provided with top covering roof means extending from on top of the one row over the space between the rows and on top of the cubicles of the other row whereby a tunnel is provided between the rows throughout their length, the wall of each cubicle which is most remote from said tunnel being covered with sheeting and the outermost upstanding wall of the first and last cubicle of each row being covered with sheeting, whereby a building is formed;
first, second, third, and fourth brushes, said first and third brushes being identical and second and fourth brushes being identical, each of said brushes having a plurality of bristles connected to a vertical shaft, the bristles being of a character normally hanging substantially vertically when the brushes are at rest but extending horizontally as a result of centrifugal force upon rotation of the brushes at a predetermined operating speed, the length of the bristles on each of the brushes being selected such that an upper group near the top of the brush and a lower group near the bottom of the brush extend to greater radial distances from the rotational axis of the brushes than do the bristles intermediate the upper and lower groups of each brush, whereby the lower bristles of the brushes are adapted to engage and clean splash pans below bumpers of the vehicle and to engage and clean rocker panels thereof and the upper group of bristles of said first and third brushes is adapted to clean fender tops and portions of the vehicles above the belt line and the upper groups of bristles of said second and fourth brushes are adapted to clean the sides of the vehicle and around portions of the windshield and back window thereof as they pass through the said tunnel;
a first support frame pivotally mounted to the front cubicle of said second row, said first brush being mounted for rotation at the outer end of said first support frame;
a first pneumatic actuator connected to said front cubicle and to said first support frame and holding said first frame normally extended from said first cubicle and supporting said first brush in said tunnel with the rotational axis of the brush on the left-hand side of the longitudinal center of the tunnel, first support frame being movable rearwardly and outwardly against the urging of said first actuator, by contact of the front of the vehicle with said first brush during movement of the vehicle through said tunnel toward the rear end of the building and said first brush support frame being generally L-shaped to avoid interference thereof with the front of a vehicle moving through said tunnel toward the rear end thereof;
a second brush support frame pivotally mounted to the front cubicle of said first row, said second frame having said second brush mounted thereto for rotation at the outer end thereof;

a second pneumatic actuator connected to the front cubicle of said first row and to said second brush support frame and normally keeping said second frame retracted substantially into said front cubicle of said first row and normally supporting said second brush at the left-hand side of the path of the vehicle passing through said tunnel;

said second actuator being operable, when actuated, to advance said second brush out toward the center of said tunnel and with a predetermined force against the left-hand side of the vehicle passing through said tunnel, said second brush support frame being generally L-shaped to avoid interference thereof with the side and rear of the vehicle as said second brush is pushed out into said tunnel and moves across the rear end of said vehicle to enable washing of the left side and left rear end portion of the vehicle, a first switch mechanically coupled to said first brush support frame and electrically coupled to a first timer coupled to a first solenoid of a first solenoid operated valve coupled to said second actuator, said first switch being operable by said first frame when said first frame is moved rearwardly by contact of said first brush with the front of the vehicle to initiate said first timer, said first timer being set to actuate said first solenoid valve to a first condition and thereby pressurize one side of a piston in said second actuator to advance said second brush after the front of said vehicle has passed a vertical plane transverse to the direction of movement of the vehicle through the tunnel and containing the axis of rotation of said second brush;

a third brush support frame pivotally mounted to the second cubicle in said first row with said third brush being mounted for rotation at the outer end thereof;

a third pneumatic actuator connected to said second cubicle and to said third brush support frame and holding said third brush normally disposed out in said tunnel at the longitudinal center thereof whereby said third brush is contacted by the front end of the vehicle as it moves through said tunnel toward the rear end thereof, said third brush support frame being generally L-shaped to avoid contact thereof with the front of the vehicle as the vehicle moves through said tunnel and pushes said third brush rearwardly and outwardly in an arc in said tunnel against the urging of said third actuator to a position of partial retraction into said second cubicle of said first row, whereby said third brush is operable to scrub the left front portion of the vehicle and the left side thereof as said vehicle moves through the tunnel;

a fourth brush support frame pivotally mounted to the second cubicle of said second row and having said fourth brush mounted for rotation at the outer end thereof;

a fourth pneumatic actuator connected to the second cubicle of said second row and to said fourth frame and keeping said fourth frame substantially retracted into said second cubicle of said second row and normally supporting said fourth brush at the right-hand side of the path of the vehicle passing through said tunnel, with a portion of said fourth brush extending into said tunnel and lightly engageable with the side of said vehicle as the vehicle moves through the tunnel;

said fourth actuator being operable, when actuated, to advance said fourth brush out toward the center of said tunnel and with a predetermined force against the right-hand side of said vehicle and around the rear of the vehicle as said vehicle moves through the tunnel for scrubbing the right side and rear end thereof, said fourth brush frame being generally L-shaped to avoid interference thereof with the vehicle;

a second switch mechanically coupled to said third brush support frame and electrically coupled to a second timer coupled to a second solenoid on a second solenoid operated valve coupled to said fourth actuator, said second switch being operable by said third frame when said third frame is moved rearwardly by contact of said third brush with the front of the vehicle to initiate said second timer, said second timer being set to actuate said second solenoid valve to a first condition thereof and thereby pressurize one side of a piston in said fourth actuator to advance said fourth brush after the front of the vehicle has passed a vertical plane transverse to the direction of movement of the vehicle through the tunnel and containing the axis of rotation of said fourth brush;

a third switch mechanically coupled to said second frame and electrically coupled to a third solenoid connected to said first solenoid valve, said third switch being operable when said second frame has moved said second brush across the left rear end of the vehicle to the center of the tunnel to reverse actuation of said first valve and pressurize the opposite side of the piston in said second pneumatic actuator and return said second brush to its initial position at the left-hand side of the path of the vehicle passing through said tunnel;

a fourth switch mechanically coupled to said fourth frame and electrically coupled to a fourth solenoid connected to said second solenoid valve, said fourth switch being operable when said fourth frame has moved said fourth brush across the right rear end of the vehicle to the center of the tunnel to reverse actuation of said second valve and pressurize the opposite side of the piston in said fourth pneumatic actuator and return said fourth brush to its initial position at the right-hand side of said vehicle path;

first rinse means mounted to said front cubicles and controlled by a first rinse solenoid valve, said first rinse solenoid valve having its solenoid electrically coupled to said first switch to turn on said first rinse means and pre rinse the vehicle as said first frame is moved rearwardly and held out of said tunnel by said vehicle;

second rinse means mounted to the third cubicles of said first and second rows and controlled by a second rinse solenoid valve;

blower means disposed in the fourth cubicles of said first and second rows and directing a blast of air onto the vehicle as the vehicle moves through the portion of the tunnel between said fourth cubicles;

wheel washing means in said tunnel between the first cubicle of the first row and the first cubicle of the second row, said wheel washing means including a left wheel brush support frame at the left side of said tunnel and a right wheel brush support frame at the right side of said tunnel, each wheel brush support frame having an elongated stiff bristled brush mounted horizontally thereon for rotation on a horizontal axis and each wheel brush support frame having a pneumatic actuator connected thereto and to one of said cubicles whereby said frames are movable to engage the brush thereon with the vehicle wheels, said frames including spray and soap solution discharge means directed onto said wheels for washing thereof as the wheels roll along, the right wheel brush support frame at the right-hand of said tunnel being movable inwardly into the tunnel the distance required by the width of the track of the vehicle to engage the right-hand wheels thereof, the length of each brush being equal at least to the outer circumference of the wheel of the vehicle passing through the tunnel to wash the entire sidewall thereof as the vehicle rolls through the tunnel;

a wheel spray solenoid valve in circuit with a wheel frame actuator solenoid valve and with a wheel brush drive motor controller and with a fifth switch whereby said fifth switch controls said wheel washing means;

a photo-electric control beam established across said tunnel at said second rinse means and controlling a rinse control photo-electric switch in circuit with said second rinse valve solenoid to turn on said second rinse means when the vehicle breaks said beam;

second and third photo-electric beams established across said tunnel between the next to last, and last cubicles, respectively, and controlling blower control photo-electric switches in circuit with blower control timers, said timers including blower control switches in circuit with a blower drive motor controller for energizing said blower means;

a conveyor drive motor relay timer in circuit with a sixth switch, said sixth switch being coupled to a pneumatic switch control tube lying across an entrance ramp to said tunnel to start a conveyor when a front wheel of the vehicle crosses the tube;

an entrance gate normally extending across the path of a vehicle at the front of a conveyor, to prevent the vehicle from crossing the pneumatic tube until the gate is lifted;

a gate holding photo-electric beam established across the area under the gate to keep the gate lifted while the vehicle is passing the gate;

seventh and eighth switches;

and a gate opening circuit including a coin operated initiator switch, a gate controller, and said seventh and eighth switches in series, said seventh switch being closed by said first arm when said first arm is in its starting position, and said eighth switch being closed by said third arm when said third arm is in its starting position;

and a top brush mounted for rotation on a horizontal axis on the outer end of an overhead top brush frame substantially less in overall width than the width of the vehicle to be washed in the tunnel, said top brush having shorter bristles in the central portion thereof than the bristles at the outer edges thereof, the outer bristles being adapted thereby to extend down around the downwardly curving portions of the top of the vehicle and across the fender tops of the vehicle for washing thereof, but the frame being sufficiently narrow to avoid interference with vehicle mounted antennas, said top brush being normally disposed in the tunnel in front of the vehicle as it moves through and being lifted by the vehicle and supported by the hood, windshield, top, back window, and rear deck thereof in succession as the vehicle is pulled through the tunnel, said top brush support frame having a counterbalance thereon whereby the pressure applied by the top brush to the vehicle is substantially constant during its movement vertically by the vehicle as the vehicle passes through said building;

drive motors for said first, second, third, fourth, and top brushes and mounted on the frame therefor and having a controller in circuit with a switch controlled by a brush timer;

said brush timer being in circuit with said first switch to initiate operation of said timer when said first switch is closed, to start said first, second, third, fourth and top brushes when said first brush is pushed rearwardly by the vehicle, said brush timer keeping said brushes in operation until after said fourth brush has moved across the rear end of the vehicle;

the lower supporting margins of the building being substantially coplanar whereby said car washing apparatus including conveyors and brushes therefor and floor thereof are positionable on a planar surface such as a parking lot and movable from place to place on the planar surface without the necessity of providing depressions in said supporting planar surface.

2. The apparatus of claim 1 and further comprising:
floor and cubicle support frame means extending across the building under said cubicles and said tunnel,
floor members on said frame means, the floor members in the portion of said tunnel at said second rinse means sloping downwardly;
sump means receiving rinse water originating at said second rinse means and directed by said sloping floor members into said sump means, the water collected in said sump means being thereafter pumped to said first rinse means.

3. A car washing apparatus comprising:
a first plurality of cubicles connected together in a first row, and a second plurality of cubicles connected together in a second row, said first and second rows being spaced apart to permit passage of a vehicle therebetween, said cubicles being provided with top covering roof means extending from on top of the one row over the space between the rows and on top of cubicles of the other row whereby a tunnel is provided between the rows throughout their length, the cubicle walls which are most remote from said tunnel being closed and the outermost upstanding wall of the first and last cubicle of each row being closed, whereby a building is formed;

first, second, third, and fourth brushes, each of said brushes having a plurality of bristles of a character normally hanging substantially vertically when the brushes are at rest but extending horizontally as a result of centrifugal force upon rotation of the brushes at a predetermined operating speed, the length of the bristles on each of the brushes being selected such that the bristles of an upper group near the top of the brush and the bristles of a lower group near the bottom of the brush extend to greater radial distances from the rotational axis of the brushes than do the bristles intermediate the upper and lower groups of each brush when the brushes are rotating, whereby the lower bristles of the brushes are adapted to engage and clean splash pans below bumpers of the vehicle and to engage and clean rocker panels thereof and the upper group of bristles of asid first and third brushes is adapted to clean fender tops and portions of the vehicles above the belt line, and the upper groups of bristles of said second and fourth brushes are adapted to clean the sides of the vehicle and around portions of the windshield and back window thereof as they pass through the said tunnel;

a first support frame pivotally mounted to the front cubicle of said second row, said first brush being mounted for rotation at the outer end of said first support frame;

a first pneumatic actuator connected to said front cubicle and to said first support frame and holding said first frame normally extended from said first cubicle and supporting a portion of said first brush in said tunnel on the left-hand side of the longitudinal center line of the tunnel, said first support frame being movable rearwardly and outwardly against the urging of said first actuator, by contact of the front of the vehicle with said first brush during movement of the vehicle through said tunnel toward the rear end of the building and said first brush support frame being generally L-shaped to avoid interference thereof with the front of a vehicle moving through said tunnel toward the rear end thereof;

a second brush support frame pivotally mounted to the front cubicle of said first row, said second frame having said second brush mounted thereto for rotation at the outer end thereof;

a second pneumatic actuator connected to the front cubicle of said first row and to said second brush support frame and normally keeping said second frame retracted substantially into said front cubicle of said first row supporting said second brush at the left-hand side of the path of the vehicle passing through said tunnel;

said second actuator being operable, when actuated, to advance said second brush out toward the center of said tunnel and with a predetermined force against the left-hand side of the vehicle passing through said tunnel, said second brush support frame being generally L-shaped to avoid interference thereof with the side and rear of the vehicle as said second brush is pushed out into said tunnel and moves across the rear end of said vehicle, to enable washing of the left side and left rear end portion of the vehicle, a first switch mechanically coupled to said first brush support frame and electrically coupled to a first timer coupled to a first solenoid of a first solenoid operated valve coupled to said second actuator, said first switch being operable by said first frame when said first frame is moved rearwardly by contact of said first brush with the front of the vehicle to initiate said first timer, said first timer being set to actuate said first solenoid valve to a first condition and thereby pressurize one side of a piston in said second actuator to advance said second brush after the front of said vehicle has passed a vertical plane transverse to the direction of movement of the vehicle through the tunnel and containing the axis of rotation of said second brush;

a third brush support frame pivotally mounted to the second cubicle in said first row with said third brush being mounted for rotation at the outer end thereof;

a third pneumatic actuator connected to said second cubicle and to said third brush support frame and holding said third brush normally disposed out in said tunnel at the longitudinal center thereof whereby said third brush is contacted by the front end of the vehicle as it moves through said tunnel toward the rear end thereof, said third brush support frame being generally L-shaped to avoid contact thereof with the front of the vehicle as the vehicle moves through said tunnel and pushes said third brush rearwardly and outwardly in an arc in said tunnel against the urging of said third actuator to a position of partial retraction into said second cubicle of said first row, whereby said third brush is operable to scrub the left front portion of the vehicle and the left side thereof as said vehicle moves through the tunnel;

a fourth brush support frame pivotally mounted to the second cubicle of said second row and having said fourth brush mounted for rotation at the outer end thereof;

a fourth pneumatic actuator connected to the second cubicle of said second row and to said fourth frame and normally keeping said fourth frame substantially retracted into said second cubicle of said second row supporting said fourth brush at the right-hand side of the path of the vehicle passing through said tunnel, with a portion of said fourth brush extending into said tunnel and lightly engageable with the side of said vehicle as the vehicle moves through the tunnel;

said fourth actuator being operable, when actuated, to advance said fourth brush out toward the center of said tunnel and with a predetermined force against the right-hand side of said vehicle and around the rear of the vehicle as said vehicle moves through the tunnel for scrubbing the right side and rear end thereof, said fourth brush frame being generally L-shaped to avoid interference thereof with the vehicle;

a second switch mechanically coupled to said third brush support frame and electrically coupled to a second timer coupled to a second solenoid on a second solenoid operated valve coupled to said fourth actuator, said second switch being operable by said third frame when said third frame is moved rearwardly by contact of said third brush with the front of the vehicle to initiate said second timer, said second timer being set to actuate said second solenoid valve to a first condition thereof and thereby pressurize one side of a piston in said fourth actuator to advance said fourth brush after the front of the vehicle has passed a vertical plane transverse to the direction of movement of the vehicle through the tunnel and containing the axis of rotation of said fourth brush;

a third switch mechanically coupled to said second frame and electrically coupled to a third solenoid connected to said first solenoid valve, said third switch being operable when said second frame has moved said second brush across the left rear end of the vehicle to the center of the tunnel to reverse actuation of said first valve and pressurize the opposite side of the piston in said second pneumatic actuator and return said second brush to its initial position at the left-hand side of the path of the vehicle passing through said tunnel;

a fourth switch mechanically coupled to said fourth frame and electrically coupled to a fourth solenoid connected to said second solenoid valve, said fourth switch being operable when said fourth frame has moved said fourth brush across the right rear end of the vehicle to the center of the tunnel to reverse actuation of said second valve and pressurize the opposite side of the piston in said fourth pneumatic actuator and return said fourth brush to its initial position at the right-hand side of said vehicle path;

first rinse means mounted to said front cubicles and controlled by a first rinse solenoid valve, said first rinse solenoid valve having its solenoid electrically coupled to said first switch to turn on said first rinse means and pre-rinse the vehicle as said first frame is moved rearwardly and held out of said tunnel by said vehicle;

second rinse means mounted to the third cubicles of said first and second rows and controlled by a second rinse solenoid valve;

blower means disposed in the fourth cubicles of said first and second rows and directing a blast of air onto the vehicle as the vehicle moves through the portion of the tunnel between said fourth cubicles;

a fifth switch operable by a wheel of the vehicle as it moves through said tunnel;

wheel washing means in said tunnel between the first cubicle of the first row and the first cubicle of the second row, said wheel washing means including a left wheel brush support frame at the left side of said tunnel and a right wheel brush support frame at the right side of said tunnel, each wheel brush support frame having an elongated stiff bristled brush mounted horizontally thereon for rotation on a horizontal axis and each frame having a pneumatic actuator connected thereto and to one of said cubicles whereby said frame is movable to engage the brush thereon with the vehicle wheels, said frames including spray and soap solution discharge means directed onto said wheels for washing thereof as the wheels roll along, the right wheel brush support frame at the right-hand of said tunnel being movable inwardly into the tunnel the distance required by the width of the track of the vehicle to engage the right-hand wheels thereof, the length of each brush being equal at least to the outer circumference of the wheel of the vehicle passing through the tunnel to wash the entire sidewall thereof as the vehicle rolls through the tunnel;

a wheel spray solenoid valve in circuit with a wheel frame actuator solenoid valve and with a wheel brush drive motor controller and with said fifth switch whereby said fifth switch controls said wheel washing means;

a photo-electric control beam established across said tunnel at said second rinse means and controlling a rinse control photo-electric switch in circuit with said second rinse valve solenoid to turn on said second rinse means when the vehicle breaks said beam;

second and third photo-electric beams established across said tunnel between the next to last, and last cubicles, respectively, and controlling blower control photo-electric switches in circuit with blower control timers, said timers incuding blower control switches in circuit with a blower drive motor controller for energizing said blower means;

a conveyor drive timer in circuit with a sixth switch, said sixth switch being coupled to a pneumatic switch control tube lying across an entrance ramp to said tunnel to start a conveyor when a front wheel of the vehicle crosses the tube;

an entrance gate normally extending across the path of a vehicle to prevent the vehicle from crossing the pneumatic tube until the gate is lifted;

seventh and eighth switches;

a gate holding photo-electric beam established across the area under the gate to keep the gate lifted while the vehicle is passing the gate;

and a gate opening circuit including a coin operated initiator switch, a gate controller, and said seventh and eighth switches in series, said seventh switch being closed by said first arm when said first arm is in its starting position, and said eighth switch being closed by said third arm when said third arm is in its starting position;

and a top brush mounted for rotation on a horizontal axis on the outer end of an overhead top brush frame substantially less in overall width than the width of the vehicle to be washed in the tunnel, said top brush having shorter bristles in the central portion thereof than the bristles at the outer edges thereof, the outer bristles being adapted thereby to extend down around the downwardly curving portions of the top of the vehicle and across the fender tops of the vehicle for washing thereof, but the frame being sufficiently narrow to avoid interference with vehicle mounted antennas, said top brush being normally disposed in the tunnel in front of the vehicle as it moves through and being lifted by the vehicle and supported by the hood, windshield, top, back window, and rear deck thereof in succession as the top brush is pulled through the tunnel, said top brush support frame having a counterbalance thereon whereby the pressure applied by the top brush to the vehicle is substantially constant during its movement vertically by the vehicle as the vehicle passes through said building;

drive motors for said first, second, third, fourth, and top brushes and mounted on the frames therefor and having a controller in circuit with a switch controlled by a brush timer;

said brush timer being in circuit with said first switch to initiate operation of said timer when said first switch is closed, to start said first, second, third, fourth and top brushes when said first brush is pushed rearwardly by the vehicle, said brush timer keeping said brushes in operation until after said fourth brush has moved across the rear end of the vehicle;

the lower supporting margins of the building being substantially coplanar whereby said car washing apparatus including floor means thereof are positionable on a planar surface such as a parking lot and movable from place to place on the planar surface without the necessity of providing depressions in said supporting planar surface.

4. A car washing apparatus comprising:

a first plurality of cubicles connected together in a first row, and a second plurality of cubicles connected together in a second row, said first and second rows being spaced apart to permit passage of a vehicle therebetween, said cubicles being provided with roof means covering them and covering the space between the rows whereby a tunnel is provided between the rows throughout their length, the outer wall of each cubicle being closed whereby a building is formed;

first, second, third, and fourth brushes, certain of said brushes having a plurality of bristles of selected length such that an upper group near the top of the brush and a lower group near the bottom of the brush extend to greater radial distances from the rotational axis of the brushes than do the bristles intermediate the upper and lower groups, whereby the lower bristles are adapted to engage and clean splash pans below bumpers of the vehicle and to engage and clean rocker panels thereof and the upper bristles are adapted to clean fender tops and portions of the vehicle above the belt line as the vehicle passes through the said tunnel;

a first support frame pivotally mounted to a first cubicle of said second row, said first brush being mounted for rotation at the outer end of said first support frame;

a first pneumatic actuator connected to said first cubicle and to said first support frame and employing air pressure to hold said first frame normally extended from said first cubicle and supporting a portion of said first brush on the left-hand side of the longitudinal center line of the tunnel, said first support frame being movable rearwardly and outwardly against the urging of said first actuator, by contact of the front of the vehicle with said first brush during movement of the vehicle through said tunnel toward the rear end of the building, said first brush support frame being shaped to avoid interference thereof with the vehicle moving through said tunnel toward the rear end thereof;

a second brush support frame pivotally mounted to a first cubicle of said first row, said second frame having said second brush mounted thereto for rotation at the outer end thereof;

a second pneumatic actuator connected to said first cubicle of said first row and to said second brush support frame and normally keeping said second frame retracted substantially into said first cubicle of said first row supporting said second brush at the left-hand side of the path of the vehicle passing through said tunnel;

said second actuator being alternately operable to advance said second brush out toward the center of said tunnel and with a predetermined force against the left-hand side of the vehicle passing through said tunnel, said second brush support frame being shaped to avoid interference thereof with the side and rear of the vehicle as said second brush is pushed out into said tunnel and moves across the rear end of said vehicle, to enable washing of the left side and left rear end portion of the vehicle;

a first switch mechanically coupled to said first brush support frame and electrically coupled through a first timer to said second actuator, said first switch being operable by said first frame when said first frame is moved rearwardly by contact of said first brush with the front of the vehicle to initiate said first timer, said first timer being set to operate said second actuator to advance said second brush after the front of said vehicle has passed a vertical plane transverse to the direction of movement of the vehicle through the tunnel and containing the axis of rotation of said second brush;

a third brush support frame pivotally mounted to a second cubicle in said first row with said third brush being mounted for rotation at the outer end thereof;

a third pneumatic actuator connected to said second cubicle and to said third brush support frame and holding said third brush normally disposed thereby out in said tunnel at the longitudinal center thereof whereby said third brush is contacted by the front end of the vehicle as it moves through said tunnel toward the rear end thereof, said third brush support frame being shaped to avoid contact thereof with the front of the vehicle as the vehicle moves through said tunnel and pushes said third brush rearwardly and outwardly in said tunnel against the urging of said third actuator to a position of partial retraction into said second cubicle of said first row, whereby said third brush is operable to scrub the left front portion of the vehicle and the left side thereof as said vehicle moves through the tunnel;

a fourth brush support frame pivotally mounted to a second cubicle of said second row and having said fourth brush mounted for rotation at the outer end thereof;

a fourth pneumatic actuator connected to said second cubicle of said second row and to said fourth frame and normally keeping said fourth frame substantially retracted into said second cubicle of said second row supporting said fourth brush at the right-hand side of the path of the vehicle passing through said tunnel, with a portion of said fourth brush extending into said tunnel and lightly engageable with the side of said vehicle as the vehicle moves through the tunnel;

said fourth actuator being alternately operable to advance said fourth brush toward the center of said tunnel and with a predetermined force against the right-hand side of said vehicle and around the rear of the vehicle as said vehicle moves through the tunnel for scrubbing the right side and rear end thereof, said fourth brush frame being shaped to avoid interference thereof with the vehicle;

a second switch mechanically coupled to said third brush support frame and electrically coupled through a second timer to said fourth actuator, said second switch being operable by said third frame when said third frame is moved rearwardly by contact of said third brush with the front of the vehicle to initiate said second timer, said second timer being set to operate said fourth actuator to advance said fourth brush after the front of the vehicle has passed a vertical plane transverse to the direction of movement of the vehicle through the tunnel and containing the axis of rotation of said fourth brush;

a third switch mechanically coupled to said second frame and electrically coupled to said second actuator, said third switch being operable when said second frame has moved said second brush across the left rear end of the vehicle to the center of the tunnel to reverse actuation of said second pneumatic actuator and return said second brush to its initial position at the left-hand side of the path of the vehicle passing through said tunnel;

a fourth switch mechanically coupled to said fourth frame and electrically coupled to said fourth actuator, said fourth switch being operable when said fourth frame has moved said fourth brush across the right rear end of the vehicle to the center of the tunnel to reverse actuation of said fourth actuator and return said fourth brush to its initial position at the right-hand side of said vehicle path;

first rinse means controlled by said first switch to turn one said first rinse means and prerinse the vehicle as said first brush support frame is moved rearwardly and held out of its initial position by said vehicle;

a fifth switch operable by a wheel of the vehicle as it moves through said tunnel;

wheel washing means in said tunnel and including a left wheel brush support frame at the left side of said tunnel and a right wheel brush support frame at the right side of said tunnel, each wheel brush support frame having an elongated brush mounted horizontally thereon for rotation on a horizontal axis and each frame having a pneumatic actuator connected thereto and to one of said cubicles whereby said frame is movable to engage the brush thereon with the vehicle wheels, one of said wheel brush support frames being movable inwardly into the tunnel the distance required by the width of the track of the vehicle to engage the wheels thereof, the length of each wheel brush being sufficient to wash the entire sidewall of the vehicle wheel as the vehicle rolls through the tunnel;

said wheel brush frame actuators, and a wheel spray means and a wheel brush drive motor controller controlled by said fifth switch whereby said fifth switch controls said wheel washing means;

a conveyor drive timer coupled to a vehicle wheel operated timer controller near the entrance to said tunnel, to start said conveyor when a front wheel of the vehicle contacts the controller;

an entrance gate normally extending across the path of a vehicle at the front of said conveyor, to prevent the vehicle wheel from contacting said timer controller until the gate is opened;

and a gate opening circuit including a coin operated initiator switch, a gate controller, and a sixth and seventh switches in series, said sixth switch being closed by said first arm when said first arm is in its starting position and said seventh switch being closed by said third arm when said third arm is in its starting position;

and a top brush mounted for rotation on a horizontal axis on the outer end of an overhead top brush frame substantially less in overall width than the width of the vehicle to be washed in the tunnel, said top brush having shorter bristles in the central portion thereof than the bristles at the outer edges thereof, the outer bristles being adapted thereby to extend down around the downwardly curving portions of the top of the vehicle and across the fender tops of the vehicle for washing thereof, but the frame being sufficiently narrow to avoid interference with vehicle mounted antennas, said top brush being normally disposed in the tunnel in front of the vehicle as it moves through and being lifted by the vehicle and supported by the hood, windshield, top, back window, and rear deck thereof in succession as the vehicle is pulled through the tunnel, said top brush support frame having a counterbalance thereon whereby the pressure applied by the top brush to the vehicle is substantially constant during its movement vertically by the vehicle as the vehicle passes through said building;

drive motors for said first, second, third, fourth, and top brushes and mounted on the frames therefor having a controller in circuit with a switch controlled by a brush timer;

said brush timer being in circuit with said first switch to initiate operation of said timer when said first switch is closed, to start said first, second, third, fourth and top brushes when said first brush is pushed rearwardly by the vehicle, said brush timer keeping said brushes in operation until after said fourth brush has moved across the rear end of the vehicle;

the lower supporting margins of the building being substantially coplanar whereby said car washing apparatus is positionable on a planar surface such as a parking lot and movable from place to place on the planar surface without the necessity of providing depressions in said supporting planar surface.

5. In a car washing apparatus the combination comprising:
  a first plurality of cubicles connected together in a first row, and a second plurality of cubicles connected together in a second row, said first and second rows being spaced apart to permit passage of a vehicle therebetween, said cubicles being provided with roof means covering them and covering the space between the rows whereby a tunnel is provided between the rows throughout their length, the outer wall of each cubicle being closed whereby a building is formed;
  first and second brushes, adapted to engage and clean splash pans below bumpers of the vehicle and to engage and clean rocker panels thereof and to clean fender tops and portions of the vehicle above the belt line as the vehicle passes through the said tunnel;
  a first support frame pivotally mounted to a first cubicle of said second row, said first brush being mounted for rotation at the outer end of said first support frame;
  a first pneumatic actuator connected to said first cubicle and to said first support frame and employing air pressure to hold said first frame normally extended from said first cubicle and supporting said first brush near the longitudinal center line of the tunnel, said first support frame being movable rearwardly and outwardly against the urging of said first actuator, by contact of the front of the vehicle with said first brush during movement of the vehicle through said tunnel toward the rear end of the building, said first brush support frame being shaped to avoid interference thereof with the vehicle moving through said tunnel toward the rear end thereof;
  a second brush support frame pivotally mounted to a first cubicle of said first row, said second frame having said second brush mounted thereto for rotation at the outer end thereof;
  a second pneumatic actuator connected to said first cubicle of said first row and to said second brush support frame and normally keeping said second frame retracted substantially into said first cubicle of said first row supporting said second brush at the left-hand side of the path of the vehicle passing through said tunnel;
  said second actuator being alternately operable to advance said second brush out toward the center of said tunnel and with a predetermined force against the left-hand side of the vehicle passing through said tunnel, said second brush support frame being shaped to avoid interference thereof with the side and rear of the vehicle as said second brush is pushed out into said tunnel and moves across the rear end of said vehicle, to enable washing of the left side and left rear end portion of the vehicle,
  a first switch mechanically coupled to said first brush support frame and electrically coupled through a first timer to said second actuator, said first switch being operable by said first frame when said first frame is moved rearwardly by contact of said first brush with the front of the vehicle to initiate said first timer, said first timer being set to operate said second actuator to advance said second brush after the front of said vehicle has passed a vertical plane transverse to the conveyor and containing the axis of rotation of said second brush;
  a return switch mechanically coupled to said second frame and electrically coupled to said second actuator, said return switch being operable when said second frame has moved said second brush across the left rear end of the vehicle toward the center of the tunnel to reverse actuation of said second pneumatic actuator and return said second brush to its initial position at the left-hand side of the path of the vehicle passing through said tunnel;
  a wheel wash control switch operable by the vehicle as it moves through said tunnel;
  wheel washing means in said tunnel and including a left wheel brush support frame at the left side of said tunnel and a right wheel brush support frame at the right side of said tunnel, each wheel brush support frame having an elongated brush mounted thereon for rotation thereon and each frame having a pneumatic actuator connected thereto and to one of said cubicles whereby said frame is movable to engage the brush thereon with the vehicle wheels, said wheel brushes being adapted to wash the entire sidewall of the vehicle wheel as the vehicle rolls through the tunnel;
  said wheel brush frame actuators, and a wheel wetting means and a wheel brush drive motor controller controlled by said wheel wash control switch whereby said wheel wash control switch controls said wheel washing means;
  drive motors for said first and second brushes and mounted on the frames therefor having a controller in circuit with a switch controlled by a brush timer;
  said brush timer being in circuit with said first switch to initiate operation of said timer when said first switch is closed, to start said first and second brushes when said first brush is pushed rearwardly by the vehicle, said brush timer keeping said brushes in operation until after said second brush has moved across the rear end of the vehicle;
  the lower supporting margins of the building being such that said car washing apparatus is positionable on a planar surface such as a parking lot and movable from place to place on the planar surface without the necessity of providing depressions in said supporting planar surface.

6. In a car washing apparatus the combination comprising:
  a first plurality of cubicles connected together in a first row, and a second plurality of cubicles connected together in a second row, said first and second rows being spaced apart to permit passage of a vehicle therebetween, said cubicles being provided with roof means covering them and covering the space between the rows whereby a tunnel is provided between the rows throughout their length, the outer wall of each cubicle being closed whereby a building is formed;
  first and second brushes, adapted to engage and clean splash pans below bumpers of the vehicle and to engage and clean rocker panels thereof and to clean fender tops and portions of the vehicle above the belt line as the vehicle passes through the said tunnel;
  a first support frame pivotally mounted to a first cubicle of said second row, said first brush being mounted for rotation at the outer end of said first support frame;
  a first pneumatic actuator connected to said first cubicle and to said first support frame and employing air pressure to hold said first frame normally extended from said first cubicle and supporting said first brush near the longitudinal center line of the tunnel, said first support frame being movable rearwardly and outwardly against the urging of said first actuator, by contact of the front of the vehicle with said first brush during movement of the vehicle through said tunnel toward the rear end of the building, said first brush support frame being shaped to avoid interference thereof with the vehicle moving through said tunnel toward the rear end thereof;
  a second brush support frame pivotally mounted to a first cubicle of said first row, said second frame having said second brush mounted thereto for rotation at the outer end thereof;

a second pneumatic actuator connected to said first cubicle of said first row and to said second brush support frame and normally keeping said second frame retracted substantially into said first cubicle of said first row, supporting said second brush at the left-hand side of the path of the vehicle passing through said tunnel;

said second actuator being alternately operable to advance said second brush out toward the center of said tunnel and with a predetermined force against the left-hand side of the vehicle passing through said tunnel, said second brush support frame being shaped to avoid interference thereof with the side and rear of the vehicle as said second brush is pushed out into said tunnel and moves across the rear end of said vehicle, to enable washing of the left side and left rear end portion of the vehicle, a first switch mechanically coupled to said first brush support frame and electrically coupled through a first timer to said second actuator, said first switch being operable by said first frame when said first frame is moved rearwardly by contact of said first brush with the front of the vehicle to initiate said first timer, said first timer being set to operate said second actuator to advance said second brush after the front of said vehicle has passed a vertical plane transverse to the direction of movement of the vehicle through said tunnel and containing the axis of rotation of said second brush;

a return switch mechanically coupled to said second frame and electrically coupled to said second actuator, said return switch being operable when said second frame has moved said second brush across the left rear end of the vehicle toward the center of the tunnel to reverse actuation of said second pneumatic actuator and return said second brush to its initial position at the left-hand side of the path of the vehicle passing through said tunnel;

a wheel wash control switch operable by the vehicle as it moves through said tunnel;

wheel washing means in said tunnel and including a left wheel brush support frame at the left side of said tunnel and a right wheel brush support frame at the right side of said tunnel, each wheel brush support frame having an elongated brush mounted thereon for rotation thereon and each frame having a pneumatic actuator connected thereto and to one of said cubicles whereby said frame is movable to engage the brush thereon with the vehicle wheels, said wheel brushes being adapted to wash the entire sidewall of the vehicle wheel as the vehicle rolls through the tunnel;

said wheel brush frame actuators, and a wheel wetting means and a wheel brush drive motor controller controlled by said wheel wash control switch whereby said wheel wash control switch controls said wheel washing means;

drive motors for said first and second brushes and mounted on the frames therefor having a controller in circuit with a switch controlled by a brush timer;

said brush timer being in circuit with said first switch to initiate operation of said timer when said first switch is closed, to start said first and second brushes when said first brush is pushed rearwardly by the vehicle, said brush timer keeping said brushes in operation until after said second brush has moved across the rear end of the vehicle.

7. In a car washing apparatus the combination comprising:

a building with a tunnel therein;

first and second brushes, adapted to engage and clean side, front, and rear portions of the vehicle as the vehicle passes through the said tunnel;

a first support frame pivotally mounted to said building, said first brush being mounted for rotation at the outer end of said first support frame;

a first actuator connected to said first support frame to hold said first frame normally extended into said tunnel and supporting said first brush out in the tunnel, said first support frame being movable rearwardly and outwardly against the urging of said first actuator, by contact of the front of the vehicle with said first brush during movement of the vehicle through said tunnel toward the rear end of the building, said first brush support frame being shaped to avoid interference thereof with the vehicle moving through said tunnel toward the rear end thereof;

a second brush support frame pivotally mounted to said building, said second frame having said second brush mounted thereto for rotation at the outer end thereof;

a second actuator connected to said second brush support frame and normally keeping said second frame retracted out of said tunnel supporting said second brush at the side of the path of the vehicle passing through said tunnel;

said second actuator being alternately operable to advance said second brush out toward the center of said tunnel and with a predetermined force against the side of the vehicle passing through said tunnel, said second brush support frame being shaped to avoid interference thereof with the side and rear to the vehicle as said second brush is pushed out into said tunnel and moves across the rear end of said vehicle, to enable washing of a side and rear end portion of the vehicle, control means responsive to rearward movement of said first brush frame and coupled to said second actuator to advance said second brush after the front of the vehicle has passed a vertical plane transverse to the direction of movement of the vehicle through the tunnel and intercepting a portion of said second brush;

and return control means coupled to said second frame and to said second actuator, and operable when said second frame has moved said second brush across a portion of the rear end of the vehicle toward the center of the tunnel to reverse actuation of said second actuator and return said second brush to its initial position at the side o fthe path of the vehicle passing through said tunnel.

8. In a vehicle washing apparatus, the combination comprising:

first and second brushes mounted respectively to first and second frames for rotation thereon, said frames being horizontally swingable on first and second pivotal axes, respectively, said axis being arranged to permit a vehicle to pass along a path therebetween as it is washed, said first pivotal axis being at one side of the said vehicle path, and said second pivotal axis being at the other side of the said vehicle path, said first and second brushes being initially substantially aligned transversely of said path, said first brush being normally disposed out in the said path and said second brush being normally at the said other side of the path, said first and second pivotal axes being staggered transversely of said vehicle path, with said first pivotal axis being substantially nearer than is said second axis to a vehicle approaching said brushes along said path, and said first frame being swingable outwardly toward said one side of the path during contact of said first brush by the vehicle and movement thereby in one direction along said path to cause said first brush to first clean the front and then one side of the vehicle, as the vehicle moves along said path in said direction, and said second frame being swingable inwardly toward the center of said path and in the said one direction to cause said second brush to first clean the other side and then the rear of the vehicle as the vehicle moves along said path, and control means coupled to said first and second frames and responsive to the outward swinging of said first frame to initiate the inward swinging of said second frame to urge said second brush inwardly against said other side of the vehicle at a point behind the front of the vehicle.

9. The combination of claim 8 and further comprising:

a first actuator coupled to said first frame and urging said first frame inwardly toward a position locating said first brush near the center of the vehicle path, a second actuator coupled to said second frame and normally keeping said second frame in a position locating said second brush at the said other side of the vehicle path, said second actuator being coupled to and alternately operable by said control means to urge said second brush against said other side of the vehicle with a predetermined force upon said initiation of said inward swinging, and return control means responsive to a predetermined degree of inward swinging of said second frame achieved after cleaning of a predetermined portion of the rear of the vehicle by said second brush to reverse actuation of said second actuator and return said second brush to its initial position at the said other side of the vehicle path.

10. In a vehicle washing apparatus, the combination comprising:

first, second, third and fourth brushes mounted respectively to first, second, third and fourth frames for rotation thereon, said frames being horizontally swingable on first, second, third and fourth pivotal axes, respectively, said first and fourth axes being located at one side of the path of a vehicle through the apparatus as it is washed, said second and third pivotal axes being located at the other side of the said vehicle path, said first and second brushes being initially substantially aligned transversely of said path, said first brush being normally disposed in a first position thereof in said path and said second brush being normally at said other side of said path, said third and fourth brushes being initially substantially aligned transversely of said path, said third brush being normally disposed in a first position thereof in said path behind said first brush, and said fourth brush being normally at said one side of said path between said first and fourth axes, actuator means coupled to said second frame and operable to swing said second brush inwardly on said second frame to a position in said path between the said first positions of said first and third brushes, following a predetermined amount of outward swinging of said first brush from said path in response to contact of said first brush with and movement thereof by a vehicle moving along said path, and additional actuator means coupled to said fourth frame and operable to swing said fourth brush inwardly on said fourth frame to a position in said path immediately behind said first position of said third brush following a predetermined amount of outward swinging of said third brush from said path in response to contact of said third brush with and movement of said brush by a vehicle moving along said path.

References Cited

UNITED STATES PATENTS

| 2,282,353 | 6/1942 | Fitch | 198—173 |
| 2,788,117 | 4/1957 | Harper | 198—173 |
| 3,035,293 | 5/1962 | Larson | 15—21 |
| 3,134,117 | 5/1964 | Frank et al. | 15—21 |
| 3,167,800 | 2/1965 | Mundo | 15—179 |
| 3,186,019 | 6/1965 | Hattori | 15—179 |
| 3,233,264 | 2/1966 | Nickl et al. | |

FOREIGN PATENTS

| 497,422 | 11/1953 | Canada. |
| 760,163 | 10/1956 | Great Britain. |
| 891,955 | 3/1962 | Great Britain. |
| 965,612 | 8/1964 | Great Britain. |

OTHER REFERENCES

S32233 II/63c 5–56 Germany (2 shts. dwg. 3 pp. spec.).

CHARLES A. WILLMUTH, *Primary Examiner.*

E. L. ROBERTS, *Assistant Examiner.*